(12) United States Patent
Obara et al.

(10) Patent No.: US 6,253,841 B1
(45) Date of Patent: Jul. 3, 2001

(54) VEHICULAR AIR CONDITIONER WITH PASSENGER-OPERATED INSIDE/OUTSIDE AIR DOUBLE FLOW MODE

(75) Inventors: So Obara; Koichi Ito, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/420,158

(22) Filed: Oct. 18, 1999

(30) Foreign Application Priority Data

Oct. 28, 1998 (JP) .................................................. 10-307522

(51) Int. Cl.[7] ....................................................... B60H 1/00
(52) U.S. Cl. ........................ 165/204; 165/42; 237/12.3 B; 454/145
(58) Field of Search ................................. 165/42, 43, 201, 165/202, 204; 454/75, 141, 145; 62/239, 243, 244; 237/5, 12.3 R, 12.3 B, 12.3 A

(56) References Cited

U.S. PATENT DOCUMENTS

| | | | |
|---|---|---|---|
| 5,582,234 | * 12/1996 | Samukawa et al. | 454/75 X |
| 5,699,960 | 12/1997 | Kato et al. | |
| 5,839,506 | * 11/1998 | Honda et al. | 165/43 X |
| 5,857,905 | * 1/1999 | Uemura et al. | 165/43 X |
| 6,079,484 | * 6/2000 | Uemura et al. | 164/43 X |
| 6,092,592 | * 7/2000 | Toyoshima et al. | 237/12.3 B X |
| 6,135,201 | * 10/2000 | Nonoyama et al. | 237/12.3 B X |
| 6,138,749 | * 10/2000 | Kawai et al. | 165/43 X |
| 6,145,754 | * 11/2000 | Uemura et al. | 165/204 X |

FOREIGN PATENT DOCUMENTS 57-130815 * 8/1982 (JP) ........................................ 165/43

* cited by examiner

Primary Examiner—Ira S. Lazarus
Assistant Examiner—Ljiljana V. Ciric
(74) Attorney, Agent, or Firm—Harness, Dickey & Pierce, PLC

(57) ABSTRACT

A vehicle air conditioner has a blower unit having first and second inside/outside air switching doors, and an air conditioning unit having defroster and foot openings. The first inside/outside air switching door is operated to correspond to a set position of an inside/outside air switching lever. The second inside/outside air switching door is operated with an operation of an air outlet mode switching lever. When an air outlet mode in which air is blown from both the foot and defroster openings is set, the second inside/outside air switching door is set to an inside air mode position. Therefore, when the first inside/outside air switching door is set to an outside air mode position in this air outlet mode, only an inside/outside air double flow mode is set. As a result, a gap between a temperature of air blown from the defroster opening and a temperature of air blown from the foot opening is prevented from abruptly changing.

8 Claims, 3 Drawing Sheets

VEHICULAR AIR CONDITIONER WITH PASSENGER-OPERATED INSIDE/OUTSIDE AIR DOUBLE FLOW MODE

CROSS REFERENCE TO RELATED APPLICATION

This application relates to and claims priority from Japanese Patent Application No. 10-307522 filed on Oct. 28, 1998, the contents of which are hereby incorporated by reference.

BACKGROUND OF THE INVENTION

1. Field of the Invention

The present invention relates to a vehicle air conditioner having a first air passage and a second air passage partitioned from each other. The air conditioner can set an inside/outside air double flow mode in which heated high-temperature inside air is blown from a foot air outlet, and low-humidity warm outside air is blown from a defroster air outlet.

2. Related Art

In a conventional vehicle air conditioner, when maximum heating is set in a foot or foot/defroster mode in which air is blown from both a foot air outlet and a defroster air outlet, an inside/outside air double flow mode (hereinafter referred to as inside/outside air mode) is automatically set by a control unit. When the air conditioner is designed to be manually operated by a passenger to reduce its manufacturing cost, the air conditioner needs to have an inside/outside air mode switching lever disposed in an air-conditioning operation panel. The mode switching lever has three air mode positions, that is, an inside air mode, an outside air mode and the inside/outside air mode. The passenger selects one of the three air modes by manual operation.

However, as shown in FIG. 3, when the passenger manually changes from the outside air mode to the inside/outside air mode while an air temperature adjusting lever for adjusting a temperature of conditioned air is set to a middle temperature position (i.e., a middle temperature area in spring and fall), a temperature of air blown from the foot outlet abruptly changes from Tf2 to Tf1, although a position of the air temperature adjusting lever does not change. As a result, a gap $\Delta T2$ between a temperature Td of air blown from the defroster outlet and Tf2 abruptly increases to a gap $\Delta T1$ between Td and Tf1. In FIG. 3, $\Delta T1$ is 21° C. with an outside air temperature of 10° C., an inside air temperature of 25° C. and an average air outlet temperature of 35° C., and $\Delta T2$ is 15° C. with an outside air temperature of 10° C. and an average air outlet temperature of 35° C. Thus, when the outside air mode is changed to the inside/outside air mode by the passenger while outside air has a relatively low temperature, the gap $\Delta T2$ abruptly increases to $\Delta T1$, thereby worsening air conditioning feeling. Further, since the passenger needs to select one from the three air mode positions of the mode switching lever, a manual operation of the air conditioner by the passenger is complicated in comparison with the operation of an air conditioner having an inside/outside air switching lever with only two air mode positions, that is, the inside air mode and the outside air mode.

SUMMARY OF THE INVENTION

In view of the foregoing problems, it is an object of the present invention to provide a vehicle air conditioner setting an inside/outside air double flow mode, which restricts the gap between the temperature of air blown from a foot outlet and the temperature of air blown from a defroster outlet from abruptly changing and simplifies manual operation.

According to the present invention, an air conditioner for a vehicle having a passenger compartment has a case forming an air passage through which air flows and having defroster and foot openings, a heating heat exchanger disposed in the case, a partition member for partitioning the air passage into a first air passage through which outside air is blown toward the defroster opening and a second air passage through which inside air is blown toward the foot opening during an inside/outside air double flow mode in which both inside air and outside air is introduced into the case, an inside/outside air switching member for setting the inside/outside air double flow mode and an operation panel. The inside/outside air switching member includes a first inside/outside air switching door for switching between inside air and outside air to be introduced into the first passage, and a second inside/outside air switching door for switching between inside air and outside air to be introduced into the second passage. The operation panel includes an air outlet mode operation member for operating the air outlet mode switching door, and an inside/outside air mode operation member for operating the first inside/outside air switching door. When an air outlet mode in which air is blown from both the foot opening and the defroster opening is selected by the air outlet mode operation member, the second inside/outside air switching door is operated with an operation of the air outlet mode operation member so that inside air is introduced into the second air passage. As a result, when outside air has a relatively low temperature in winter, and the first inside/outside air switching door is operated so that outside air is introduced into the first air passage in the air outlet mode in which air is blown from both the foot opening and the defroster opening, only the inside/outside air double flow mode can be set. That is, an outside air mode can not be set under the above-mentioned condition. As a result, a gap between a temperature of air blown from the foot opening and a temperature of air blown from the defroster opening is prevented from abruptly changing, thereby restricting air conditioning feeling from worsening. Further, the inside/outside air mode operation member has only two air mode positions, that is, an inside air mode position and an outside air mode position. Therefore, a manual operation of the air conditioner by a passenger is simplified.

Preferably, the second inside/outside air switching door is operated so that outside air is introduced into the second air passage only in a defroster mode in which air is blown from only the defroster opening, and inside air is introduced into the second air passage in any air outlet modes other than the defroster mode. As a result, an operation of the second inside/outside air switching door is simplified.

BRIEF DESCRIPTION OF THE DRAWINGS

This and other objects and features of the present invention will become more readily apparent from a better understanding of the preferred embodiment described below with reference to the accompanying drawings, in which.

DETAILED DESCRIPTION OF THE PREFERRED EMBODIMENT

A preferred embodiment of the present invention is described hereinafter with reference to the accompanying drawings. The present embodiment is suitably applied to a vehicle having an engine such as a diesel engine, in which an amount of heat generated from the engine is relatively small to sufficiently heat engine-cooling water.

Figure 1:
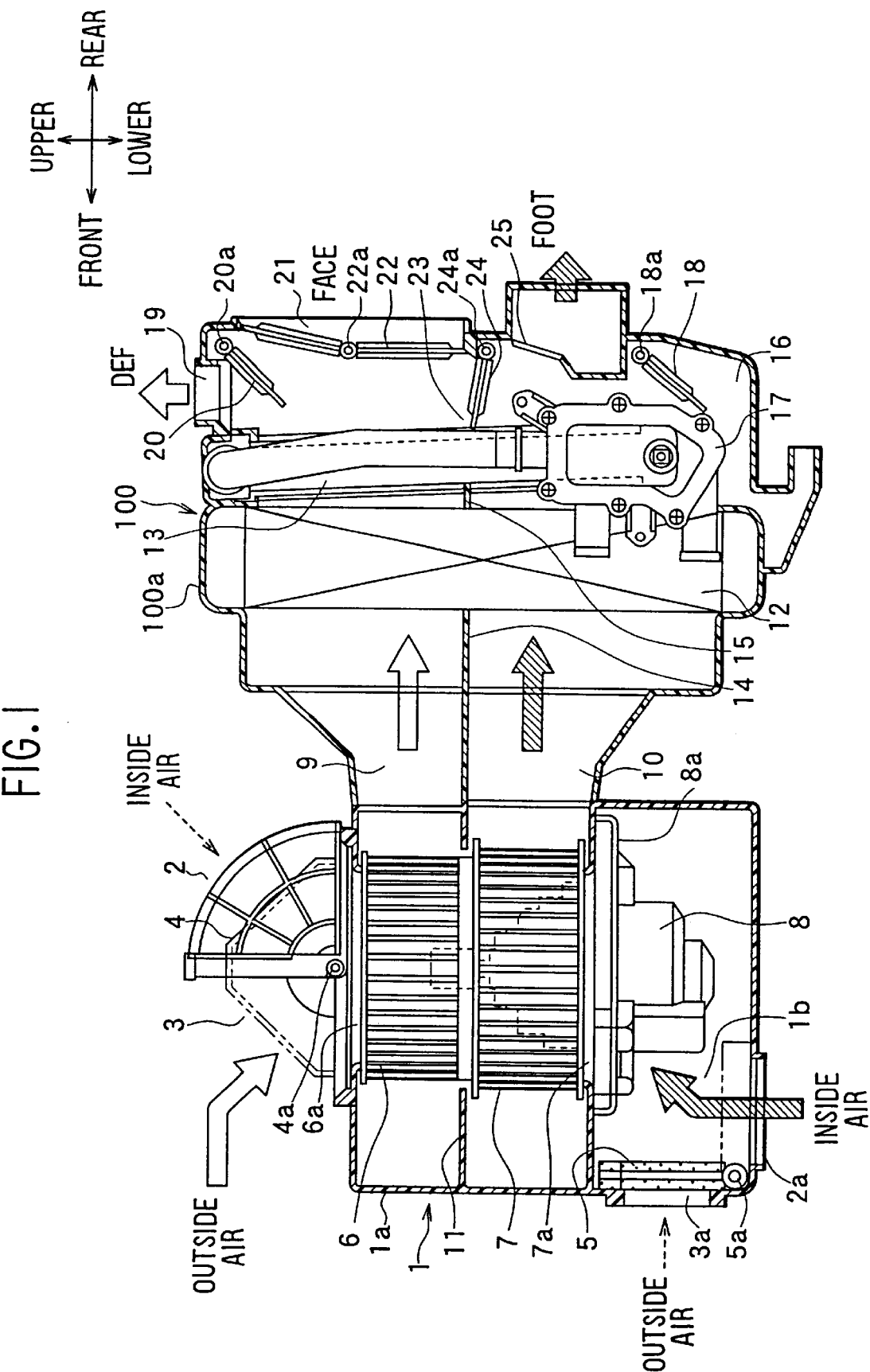
FIG. 1 is a schematic view showing a blower unit and an air conditioning unit for a vehicle air conditioner according to a preferred embodiment of the present invention.

As shown in FIG. 1, an air conditioner for a vehicle has a blower unit 1 and an air conditioning unit 100. The air conditioning unit 100 is generally disposed in a passenger compartment of the vehicle at a substantially center portion of a lower part of an instrumental panel in a vehicle width direction (i.e., right-left direction). The air conditioning unit 100 is installed in the vehicle to correspond to an arrangement direction of FIG. 1. The blower unit 1 is disposed in the passenger compartment at a front passenger's side shifted from the air conditioning unit 100 in the vehicle width direction. In FIG. 1, the blower unit 1 is shown at a vehicle front side of the air conditioning unit 100 for simplifying the drawing.

First, the blower unit 1 will be described in detail. The blower unit 1 has first and second inside air inlets 2, 2a through which inside air (i.e., air inside the passenger compartment) is introduced, and first and second outside air inlets 3, 3a through which outside air (i.e., air outside the passenger compartment) is introduced. The first inside air inlet 2 and the first outside air inlet 3 are disposed on an upper side of the blower unit 1, and are opened and closed by a first inside/outside air switching door 4. The second inside air inlet 2a and the second outside air inlet 3a are disposed on a lower side of the blower unit 1, and are opened and closed by a second inside/outside air switching door 5. The first and second outside air inlets 3, 3a are communicated with each other through a communication passage (not shown), and are connected to an outside air intake port of a vehicle.

The first inside/outside air switching door 4 is a rotary door rotatably held by a rotation shaft 4a, and is disposed at an upper side of a case 1a of the blower unit 1. The first inside/outside air switching door 4 has fan-shaped left and right side plates disposed with a predetermined interval therebetween in an axial direction of the rotation shaft 4a, and an outer peripheral wall portion which connects outer peripheral portions of the right and left side plates. The first inside air inlet 2 and the first outside air inlet 3 are opened and closed by the side plates and the outer peripheral wall portion of the first inside/outside air switching door 4.

The second inside/outside air switching door 5 is a flat door rotatably held by a rotation shaft 5a, and is disposed in a lower space 1b of the case 1a. The second inside/outside air switching door 5 opens and closes the second inside air inlet 2a and the second outside air inlet 3a. In the present embodiment, the first and second inside air inlets 2, 2a and the first and second outside air inlets 3, 3a are opened and closed by the first and second inside/outside air switching doors 4, 5. Thus, first and second inside/outside air switching doors 4 and 5 are an inside/outside air switching member.

Air introduced through the inlets 2, 2a, 3 and 3a into the case 1a is blown by a first fan 6 and a second fan 7 accommodated in the case 1a. The first and second fans 6, 7 are well-known centrifugal multi-blade fans (sirocco fans), and are integrally rotated by a single electric motor 8.

In FIG. 1, the air conditioner can set an inside/outside air double flow mode. In the inside/outside air mode, the first inside/outside air switching door 4 closes the first inside air inlet 2 and opens the first outside air inlet 3 so that outside air is sucked into an inlet 6a of the first fan 6. The second inside/outside air switching door 5 opens the second inside air inlet 2a and closes the second outside air inlet 3a so that inside air is sucked into an inlet 7a of the second fan 7. The lower space 1b of the case 1a communicating with the second inside air inlet 2a and the second outside air inlet 3a communicates with the inlet 7a of the second fan 7 through plural openings (not shown) formed in a flange portion 8a of the electric motor 8. The electric motor 8 is attached to the case 1a through the flange portion 8a.

In FIG. 1, the first fan 6 blows outside air introduced through the first outside air inlet 3 into a first air passage 9, and the second fan 7 blows inside air introduced through the second inside air inlet 2a into a second air passage 10. A partition plate 11 is disposed between the first fan 6 and the second fan 7 to partition an inside of the case 1a into the first and second air passages 9, 10. The partition plate 11 is integrally formed with the case 1a using resin. A portion of the case 1a which accommodates the first and second fans 6, 7 therein is formed into a scroll shape.

Figure 2:
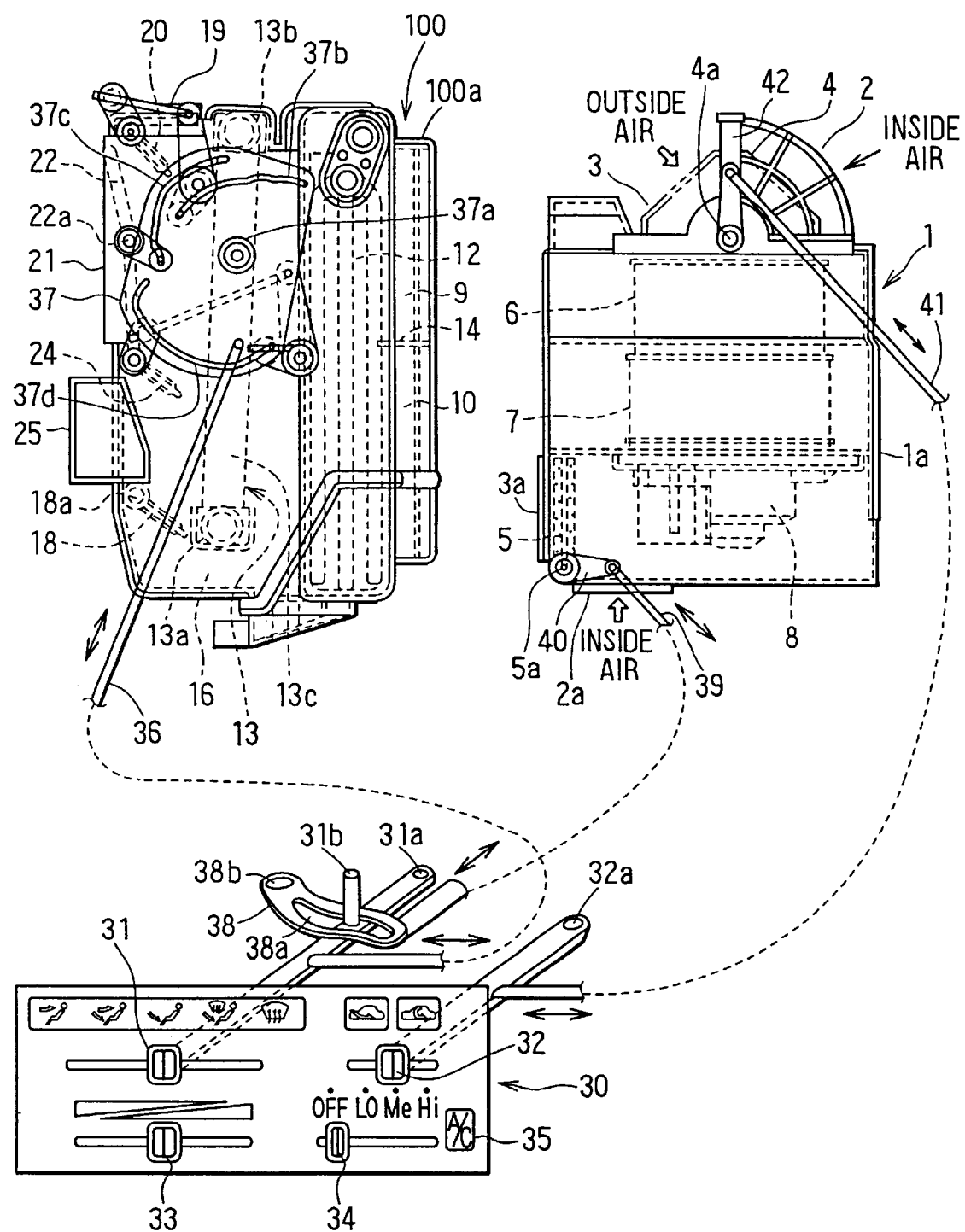
FIG. 2 is a schematic view showing links between doors in the blower unit and the air conditioning unit and levers in an air-conditioning operation panel according to the embodiment.

Next, the air conditioning unit 100 will be described in detail. The air conditioning unit 100 integrally contains an evaporator 12 (cooling heat exchanger) and a heater core 13 (heating heat exchanger) in a case 100a made of resin. In the case 100a, the evaporator 12 is disposed at a vehicle front side to cross the whole width of the first and second air passages 9, 10 in a vehicle up-down direction in FIG. 1. Refrigerant in a refrigerant cycle flows through the evaporator 12 while absorbing heat from air so that air is cooled. The heater core 13 is disposed at a downstream air side, i.e., at a vehicle rear side, of the evaporator 12 with a predetermined interval therebetween. High-temperature hot water (engine cooling water) flows through the heater core 13 to heat cool air discharged from the evaporator 12 again. The evaporator 12 and the heater core 13 are disposed in the case 100a to extend in a vehicle up-down direction and to be thinned in a vehicle front-rear direction as shown in FIGS. 1, 2.

An inside of the case 100a between an upstream air side of the evaporator 12 and an upstream air side of the heater core 13 is partitioned into the first air passage 9 disposed at a vehicle upper side and the second air passage 10 disposed at a vehicle lower side by partition plates 14, 15. The partition plates 14, 15 extend substantially horizontally and may be formed integrally with the case 100a using resin.

The evaporator 12 is formed by laminating plural flat tubes with plural corrugated fins disposed between adjacent flat tubes, and integrally brazing the laminated tubes and fins. Each of the flat tubes is formed by joining a pair of metal plates made of aluminum or the like to have a flat cross-section. The heater core 13 is also formed by laminating plural flat tubes with plural corrugated fins disposed between adjacent flat tubes, and integrally brazing the laminated tubes and fins, similarly to the evaporator 12.

The heater core 13 is disposed to cross the whole width of the first air passage 9 and a partial width of the second air passage 10 in the vehicle up-down direction in FIG. 1. As a result, a cool air bypass passage 16 is formed in a lower part of the second air passage 10.

As shown in FIG. 2, the heater core 13 has a hot water inlet tank 13a disposed in the second air passage 10, a hot water outlet tank 13b disposed in the first air passage 9, and a heater core portion 13c formed by the flat tubes and the fins and disposed between the inlet tank 13a and the outlet tank 13b. Thus, the heater core 13 is a one-way flow type in which hot water flows in one direction from the inlet tank 13a disposed at a vehicle lower side to the outlet tank 13b disposed at a vehicle upper side through the flat tubes.

Referring back to FIG. 1, a hot water valve 17 for adjusting an amount of hot water flowing into the heater core 13 is disposed on a lower side portion of the heater core 13. A temperature of air blown into the passenger compartment is controlled by adjusting the amount of hot water flowing into the heater core 13 using the hot water valve 17. The cool air bypass passage 16 is disposed below the heater core 13 in the second air passage 10, and cool air flows through the cool air bypass passage 16 to bypass the heater core 13. The cool air bypass passage 16 is opened and closed by a cool air bypass door 18. The cool air bypass door 18 is a plate door rotatably held by a rotation shaft 18a, and is operatively linked with the hot water valve 17. When the hot water valve 17 is fully closed in a maximum cooling mode, the cool air bypass door 18 fully opens the cool air bypass passage 16. When the hot water valve 17 is fully opened in a maximum heating mode, the cool air bypass door 18 fully closes the cool air bypass passage 16. When the hot water valve 17 is partially opened, the cool air bypass door 18 partially opens the cool air bypass passage 16 by a predetermined degree. Thus, in the present embodiment, air blown into the passenger compartment is adjusted by the hot water valve 17 and the cool air bypass door 18.

A defroster opening 19 is formed in an upper surface of the case 100a at a downstream air side of the heater core 13 to communicate with the first air passage 9. Air is blown from the defroster opening 19 toward an inner surface of a windshield through a defroster duct (not shown) and a defroster air outlet (not shown). The defroster opening 19 is opened and closed by a defroster door 20, which is a plate door rotatably held by a rotation shaft 20a.

A face opening 21 is formed in a vehicle rear end portion of the case 100a adjacent to the passenger to communicate with the first air passage 9. Air is blown from the face opening 21 toward the head portion of the passenger through a face duct (not shown) and a face air outlet (not shown) disposed on an upper portion of the instrumental panel. The face opening 21 is opened and closed by a face door 22, which is a butterfly door rotatably held by a rotation shaft 22a.

A communication passage 23 through which the first and second air passages 9, 10 communicate with each other is formed between the first and second air passages 9, 10. The communication passage 23 is opened and closed by a foot door 24, which is a plate door rotatably held by a rotation shaft 24a. The foot door 24 also opens and closes a foot opening 25 formed in a vehicle rear end lower portion of the case 100a at a downstream air side of the heater core 13 to communicate with the second air passage 10. Air is blown from the foot opening 25 toward the foot portion of the passenger through a foot duct (not shown) and a foot air outlet (not shown). Thus, in the present embodiment, an air outlet mode is set by the defroster door 20, the face door 22 and the foot door 24 and doors 20, 22 and 24 thus define an air outlet switching member.

In the present embodiment, as shown in FIG. 2, an air-conditioning operation panel 30 has an air outlet mode switching lever 31, an inside/outside air switching lever 32, an air temperature adjusting lever 33, an air flow amount switching lever 34 and an air conditioner switch 35. These levers and switch 31–35 are manually operated by the passenger.

The air temperature adjusting lever 33 is connected to a valve body of the hot water valve 17 and to the rotation shaft 18a of the cool air bypass door 18. A temperature of air blown into the passenger compartment is controlled by adjusting each opening degree of the hot water valve 17 and the cool air bypass door 18.

The air flow amount switching lever 34 adjusts an amount of air blown into the passenger compartment by controlling a rotation speed of the motor 8 which actuates the first and second fans 6, 7.

The air outlet mode switching lever 31 is rotated around a fulcrum 31a, and is connected to an air outlet mode link 37 through a first operation cable 36. The air outlet mode link 37 is disposed on an outer surface of the case 100a and is rotated around a fulcrum 37a. The air outlet mode link 37 has three cam grooves 37b, 37c and 37d. Each of the defroster door 20, the face door 22 and the foot door 24 is rotated by the air outlet mode link 37 through a link mechanism engaged with the cam grooves 37b, 37c and 37d. Air outlet modes of the air conditioner include a face mode in which air is blown from only the face opening 21, a bi-level mode in which air is blown from both the face opening 21 and the foot opening 25, a foot mode in which a large ratio (70–80%) of air is blown from the foot opening 25 and the rest of air is blown from the defroster opening 19, a foot/defroster mode (D/F mode) in which substantially half of air is blown from the foot opening 25 and the other half of air is blown from the defroster opening 19 and a defroster mode (DEF mode) in which air is blown from only the defroster opening 19. One of the air outlet modes is selected by opening and closing the defroster door 20, the face door 22 and the foot door 24.

Further, a pin 31b is formed integrally with the air outlet mode switching lever 31 to engage with a cam groove 38a of a link 38. The link 38 is rotated around a fulcrum 38b. An end portion of the link 38 is connected to one end of a second operation cable 39. The other end of the second operation cable 39 is connected to a link 40, which is connected to the rotation shaft 5a of the second inside/outside air switching door 5. Thus, air outlet mode switching lever 31 is means for setting an air outlet mode and for setting a position of second inside/outside air switching door 5.

The inside/outside air switching lever 32 is rotated around a fulcrum 32a, and is connected to one end of a third operation cable 41. The other end of the third operation cable 41 is connected to a link 42, which is connected to the rotation shaft 4a of the inside/outside air switching door 4. Thus, inside/outside air switching level 32 is means for setting a position of inside/outside air switching door 4.

Next, operation of the air conditioner according to the present embodiment will be described with reference to FIG. 2 and TABLES 1, 2 below.

TABLE 1

| Air Outlet Mode | Door 4 | Door 5 | Operation Mode |
|---|---|---|---|
| FACE | Inside | Inside | Inside |
| B/L | Inside | Inside | Inside |
| FOOT | Inside | Inside | Inside |
| F/D | Inside | Inside | Inside |
| DEF | Inside | Outside | Inside/Outside |

TABLE 2

| Air Outlet Mode | Door 4 | Door 5 | Operation Mode |
| --- | --- | --- | --- |
| FACE | Outside | Inside | Inside/Outside |
| B/L | Outside | Inside | Inside/Outside |
| FOOT | Outside | Inside | Inside/Outside |
| F/D | Outside | Inside | Inside/Outside |
| DEF | Outside | Outside | Outside |

In the present embodiment, the second inside/outside air switching door 5 is operated with an operation of the air outlet mode switching lever 31. That is, the second inside/outside air switching door 5 is set to a position for introducing only outside air (hereinafter referred to as an outside air mode position) in only the DEF mode, and is set to a position for introducing only inside air (hereinafter referred to as an inside air mode position) in the face (FACE), bi-level (B/L), foot (FOOT) and F/D modes.

On the other hand, the first inside/outside air switching door 4 is operated to correspond to a set position of the inside/outside air switching lever 32, which has two air mode positions, i.e., "inside air" and "outside air". That is, when the lever 32 is set to "inside air" by the passenger, the first inside/outside air switching door 4 is set to the inside air mode position. When the lever 32 is set to "outside air" by the passenger, the first inside/outside air switching door 4 is set to the outside air mode position.

Therefore, when the inside/outside air switching lever 32 is set to "inside air", an operation mode of the air conditioner is set as shown in TABLE 1. When the inside/outside air switching lever 32 is set to "outside air", the operation mode of the air conditioner is set as shown in TABLE 2. Thus, the operation mode of the air conditioner is determined according to a combination of the set position of the inside/outside air switching lever 32 set by the passenger and the air outlet mode selected by the passenger using the air outlet mode switching lever 31.

As shown in TABLE 1, when the inside/outside air switching lever 32 is set to "inside air", an inside air mode in which inside air is introduced from the first and second inside air inlets 2, 2a is set in the face, bi-level, foot and F/D modes. On the other hand, as shown in TABLE 2, when the inside/outside air switching lever 32 is set to "outside air", the inside/outside air mode in which outside air is introduced from the first outside air inlet 3 and the inside air is introduced from the second inside air inlet 2a is set in the face, bi-level, foot and F/D modes, and an outside air mode in which outside air is introduced from the first and second outside air inlets 3, 3a is set only in the DEF mode.

If the passenger erroneously set the inside/outside air switching lever 32 to "inside air" in the DEF mode, the first inside/outside air switching door 4 is set to the inside air mode position (i.e., a position indicated by a two-dot chain line in FIGS. 1, 2 ). As a result, inside air is introduced from an upper side of the case 1 and outside air is introduced from a lower side of the case 1.

When the air outlet mode switching lever 31 is set to the foot mode, and the inside/outside air switching lever 32 is set to "outside air", while outside air has a relatively low temperature in winter, the inside/outside air mode is set as shown in TABLE 2. Therefore, outside air is introduced from the first outside air inlet 3 and is sacked into the first fan 6 through the inlet 6a, while inside air is introduced from the second inside air inlet 2a and is sacked into the second fan 7 through the inlet 7a. Outside air blown by the first fan 6 flows through the first air passage 9 in the air conditioning unit 100. Inside air blown by the second fan 7 flows through the second air passage 10 in the air conditioning unit 100. The foot door 24 is operated so that both the foot opening 25 and the communication passage 23 are opened. The face door 22 closes the face opening 21, and the defroster door 20 opens the defroster opening 19 by a small degree.

When the air conditioner starts heating in winter, the temperature adjusting lever 33 fully opens the hot water valve 17 so that a maximum amount of hot water flows into the heater core 13, and the cold air bypass door 18 fully closes the cold air bypass passage 16. As a result, whole amount of blown air passes through the heater core 13 and is heated by the maximum amount of hot water, thereby setting a maximum heating mode. Outside air flowing through the first air passage 9 flows through the evaporator 12 and is heated by the heater core 13, and is blown toward the inner surface of the windshield through the defroster opening 19. Inside air flowing through the second air passage 10 flows through the evaporator 12 and is heated by the heater core 13, and is blown toward the foot portion of the passenger in the passenger compartment through the foot opening 25. In the second air passage 10, inside air having a higher temperature than that of outside air is recirculated and is heated by the heater core 13. Therefore, a temperature of air blown toward the foot portion of the passenger is relatively high, thereby improving heating efficiency. On the other hand, outside air having a lower humidity than that of inside air is heated and is blown from the defroster opening 19. Therefore, the windshield is restricted from being fogged.

In the foot mode, a ratio of an amount of air blown from the defroster opening 19 to an amount of air blown from the foot opening 25 is generally set to 20/80. This ratio is achieved by introducing warm outside air flowing through the first air passage 9 into the second air passage 10 through the communication passage 23 opened by the foot door 24.

Figure 3:
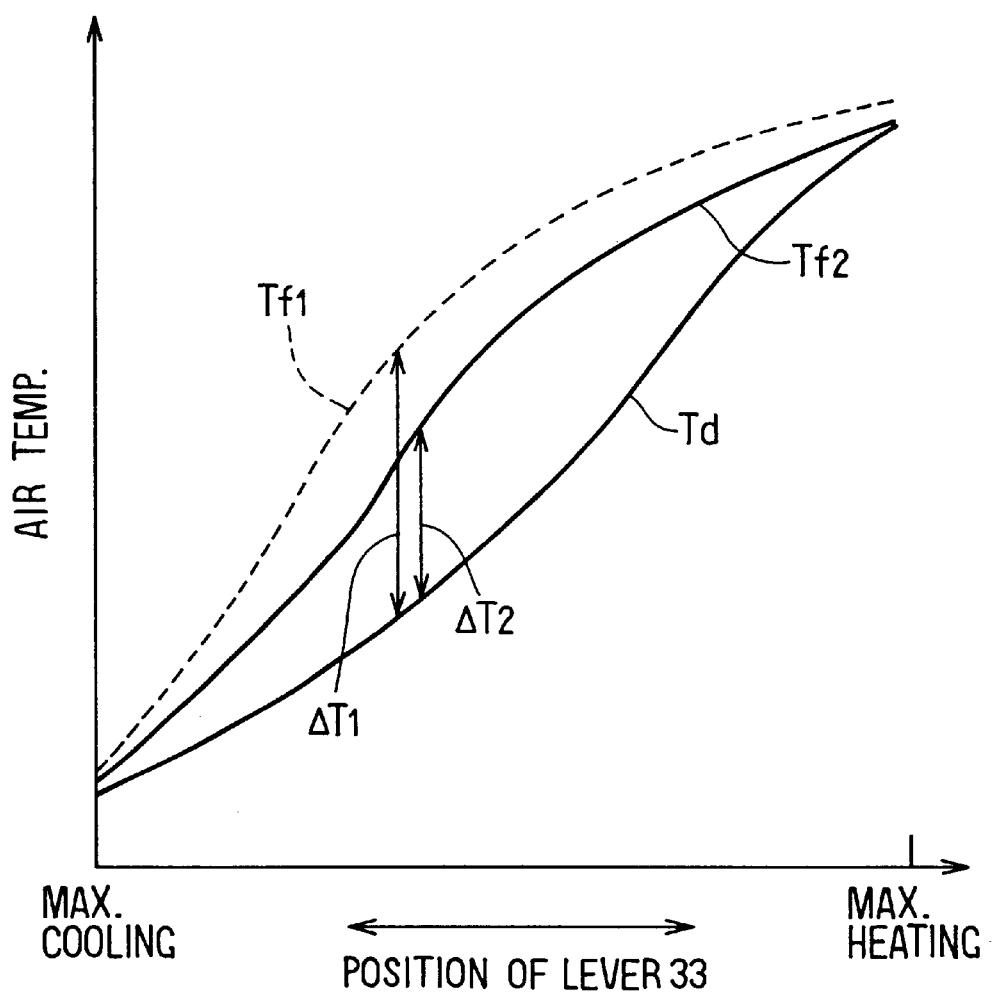
FIG. 3 is a graph showing a relationship between a position of an air temperature adjusting lever and a temperature (Tf1, Tf2) of air blown from a foot outlet or a temperature (Td) of air blown from a defroster outlet according to the embodiment.

In the maximum heating mode, since the maximum amount of hot water flows into the heater core 13, a gap between a temperature of hot water flowing in a hot water inlet portion of the core portion 13c and a temperature of hot water flowing in a hot water outlet portion of the core portion 13c is decreased, thereby decreasing a gap between a heat radiation amount of the inlet portion and that of the outlet portion. As a result, as shown in FIG. 3, a gap between a temperature of air blown from the foot opening 25 (Tf1 or Tf2) and a temperature of air blown from the defroster opening 19 (Td) is decreased in the maximum heating mode.

Next, when a temperature inside the passenger compartment increases and a heating load of the air conditioner is reduced, the hot water valve 17 is changed from a position of fully open to a position of partially open so that an amount of hot water flowing into the heater core 13 is decreased. When the opening degree of the hot water valve 17 decreases, the cool air bypass door 18 opens the cool air bypass passage 16 by a predetermined degree. When the hot water valve 17 is partially opened, the amount of hot water flowing into the heater core 13 is decreased. Therefore, the gap between a temperature of hot water in the inlet portion of the core portion 13c and a temperature of hot water in the outlet portion of the core portion 13c is increased, thereby increasing the gap between a heat radiation amount of the inlet portion and that of the outlet portion. As a result, Td is excessively low in comparison with Tf1 or Tf2.

In the present embodiment, the cool air bypass passage 16 is opened by a predetermined degree as the opening degree of the hot water valve 17 decreases. As a result, cool air from the cool air bypass passage 16 is mixed into air in the second passage 10, thereby lowering Tf1 or Tf2. Thus, the gap between Tf1 or Tf2 and Td (i.e., ΔT1 or ΔT2) is restricted from excessively increasing.

When the F/D mode is selected by the air outlet mode switching lever 31, the air conditioner performs the same operation as in the foot mode. However, in the F/D mode, the defroster door 20 fully opens the defroster opening 19, and the foot door 24 fully closes the communication passage 23 and fully opens the foot opening 25 as shown in FIG. 1, 3. Therefore, in the F/D mode, an amount of air blown from the defroster opening 19 is increased in comparison with in the foot mode, and a ratio of an amount of air blown from the defroster opening 19 to an amount of air blown from the foot opening 25 is substantially 50/50.

When the air conditioner switch 35 is turned off and the compressor does not operate, air is not cooled nor dehumidified by the evaporator 12. In this case, if the inside/outside air switching lever 32 is set to "inside air" while the air conditioner performs heating in winter, the windshield may be fogged due to increased humidity of air in the passenger compartment. Therefore, the passenger generally set the inside/outside air switching lever 32 to "outside air" while the air conditioner performs heating in winter. Thus, when the air conditioner switch 35 is turned off and the air conditioner performs heating in winter, the passenger generally set the inside/outside air switching lever 32 to "outside air" in the foot or F/D mode, thereby setting only the inside/outside air mode as shown in TABLE 2. Therefore, in the present embodiment, the temperature of air blown from the foot outlet constantly becomes Tf2, and change between ΔT1 and ΔT2 caused by switching between the outside air mode and the inside/outside air mode does not occur. As a result, air conditioning feeling is restricted from worsening.

When the air conditioner switch 35 is turned on and the compressor operates, air is cooled and dehumidified by the evaporator 12 and the inside air mode can be set. Therefore, switching between the inside air mode and the inside/outside air mode may be performed by manual operation. However, in this case, blown air constantly flows through the evaporator 12 and is cooled. Therefore, difference in temperature of air discharged from the evaporator 12 between the first passage 9 and the second passage 10 is relatively small even if switching between the inside air mode and the inside/outside air mode is performed.

When the DEF mode is selected, the inside/outside air switching lever 32 is generally set to "outside air" so that the windshield is restricted from being fogged. As a result, the air conditioner sets the outside air mode as shown in TABLE 2.

In the above-mentioned embodiment, the second inside/outside air switching door 5 is set to the outside air mode position only in the DEF mode, and is set to the inside air mode position in the other air outlet modes. However, an original objective of setting the inside/outside air mode is to improve heating efficiency around the foot portion of the passenger while the air conditioner performs heating in winter and to restrict the windshield from being fogged. Therefore, the second inside/outside air switching door 5 may be set to the inside air mode position at least in the foot and F/D modes, and set to the outside air mode position in the face, bi-level and DEF modes.

In the above-mentioned embodiment, the levers 31–33 in the operation panel 30 are mechanically connected to the doors 4, 5, 20, 22 and 24, the hot water valve 17 and so on. However, the doors 4, 5, 20, 22 and 24 and the valve 17 may be driven by an electric actuator such as a servomotor. The servomotor is controlled according to each operation position of the levers 31–33.

In the above-mentioned embodiment, the foot door 24 is operated so that both the foot opening 25 and the communication passage 23 are opened in the foot mode, and the foot opening 25 is fully opened and the communication passage 23 is fully closed in the F/D mode. However, the foot door 24 may be operated so that the foot opening 25 is fully opened and the communication passage 23 is fully closed in the foot mode. Generally, the vehicle air conditioner has a center face outlet (not shown) disposed at a center of the instrumental panel and a pair of side face outlets (not shown) at right and left ends of the instrumental panel in a vehicle right-left direction. Air flowing into the face opening 21 is blown out through the center face outlet. The side face outlets are used for cooling in summer and for restricting the windshield from being fogged in winter. Therefore, conditioned air in an upstream side of the face door 22 constantly flows into the side face outlets. As a result, when the foot or F/D mode is selected and the foot door 24 is operated so that the foot opening 25 is fully opened and the communication passage 23 is fully closed, warm outside air flowing through the first air passage 9 is blown from the defroster outlet through the defroster opening 19 and from the side face outlets. In this case, a ratio of an amount of air blown from the foot outlet, the defroster outlet and the side face outlets may be 50/20/30.

The present invention may be applied to an air conditioner including an air conditioning unit without an evaporator.

Although the present invention has been fully described in connection with a preferred embodiment thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. An air conditioner for a vehicle having a passenger compartment, said air conditioner comprising:
 a case for forming an air passage through which air flows, said case having a defroster opening from which air is blown toward an inner surface of a windshield of the vehicle and a foot opening from which air is blown toward a lower side of the passenger compartment;
 a heating heat exchanger for heating the air disposed in said case;
 a partition member for partitioning said air passage into a first air passage through which outside air is blown toward said defroster opening and a second air passage through which inside air is blown toward said foot opening during an inside/outside air double flow mode in which both the inside air and the outside air is introduced into said air passage;
 an inside/outside air switching member for setting the inside/outside air double flow mode, said inside/outside air switching member including a first inside/outside air switching door for switching between the inside air and the outside air to be introduced into said first air passage, and a second inside/outside air switching door for switching between the inside air and the outside air to be introduced into said second air passage;
 an air outlet mode switching member for opening and closing said foot opening and said defroster opening;

an operation panel disposed in the passenger compartment to be operated by a passenger, said operation panel including an air outlet mode operation member for operating said air outlet mode switching member, and an inside/outside air mode operation member for operating said first inside/outside air switching door, wherein said second inside/outside air switching door is operated with an operation of said air outlet mode operation member so that the inside air is introduced into said second air passage, when an air outlet mode in which air is blown from both said foot opening and said defroster opening is selected by said air outlet mode operation member.

2. The air conditioner according to claim 1, wherein said second inside/outside air switching door is operated with an operation of said air outlet mode operation member so that the outside air is introduced into said second air passage in a defroster mode in which air is blown from only said defroster opening, and the inside air is introduced into said second air passage in any air modes other than said defroster mode.

3. The air conditioner according to claim 1, further comprising a hot water valve for adjusting a temperature of conditioned air by adjusting an amount of hot water circulating in said heating heat exchanger.

4. The air conditioner according to claim 3, wherein said heating heat exchanger has one-way flow such that the hot water flows in one way from said second air passage to said first air passage.

5. The air conditioner according to claim 1, wherein said second inside/outside air switching door is connected to said air outlet mode operation member.

6. The air conditioner according to claim 1, wherein:

said inside/outside air switching member includes first and second inside air inlets and first and second outside air inlets formed in said case;

said first inside air inlet and said first outside air inlet are disposed in an upper side of said case; and said second inside air inlet and said second outside air inlet are disposed in a lower side of said case.

7. The air conditioner according to claim 1, further comprising:

a first blower disposed in said first air passage for blowing air toward the passenger compartment; and a second blower disposed in said second air passage for blowing air toward the passenger compartment.

8. An air conditioner for a vehicle having a passenger compartment, said air conditioner comprising:

a case for forming an air passage through which air flows, said case having a defroster opening from which air is blown toward an inner surface of a windshield of the vehicle and a foot opening from which air is blown toward a lower side of the passenger compartment;

a heating heat exchanger for heating the air disposed in said case;

a partition member for partitioning said air passage into a first air passage through which outside air is blown toward said defroster opening and a second air passage through which inside air is blown toward said foot opening during an inside/outside air double flow mode in which both the inside air and the outside air is introduced into said air passage;

an inside/outside air switching member for setting the inside/outside air double flow mode, said inside/outside air switching member including a first door for switching between the inside air and the outside air to be introduced into said first air passage, and a second door for switching between the inside air and the outside air to be introduced into said second air passage;

first means for setting a position of said first door; and second means for setting an air outlet mode and for setting a position of said second door so that the inside air is introduced into said second air passage in an air outlet mode in which air is blown from both said foot opening and said defroster opening.

* * * * *